United States Patent
Björkman et al.

(10) Patent No.: US 11,097,713 B2
(45) Date of Patent: Aug. 24, 2021

(54) METHOD AND SYSTEM FOR SWITCHING FROM A FIRST POWER SUPPLY PATH TO A SECOND POWER SUPPLY PATH

(71) Applicant: Scania CV AB, Södertälje (SE)

(72) Inventors: Mathias Björkman, Tullinge (SE); Niklas Pettersson, Stockholm (SE)

(73) Assignee: Scania CV AB, Södertälje (SE)

(*) Notice: Subject to any disclaimer, the term of this patent is extended or adjusted under 35 U.S.C. 154(b) by 138 days.

(21) Appl. No.: 15/513,033

(22) PCT Filed: Oct. 26, 2015

(86) PCT No.: PCT/SE2015/051130
§ 371 (c)(1),
(2) Date: Mar. 21, 2017

(87) PCT Pub. No.: WO2016/068780
PCT Pub. Date: May 6, 2016

(65) Prior Publication Data
US 2017/0297551 A1    Oct. 19, 2017

(30) Foreign Application Priority Data
Oct. 30, 2014    (SE) .................................. 1451299-0

(51) Int. Cl.
*B60W 10/24* (2006.01)
*B60W 10/08* (2006.01)
(Continued)

(52) U.S. Cl.
CPC .............. *B60W 10/08* (2013.01); *B60K 6/22* (2013.01); *B60K 6/28* (2013.01); *B60K 6/48* (2013.01);
(Continued)

(58) Field of Classification Search
CPC .......... H01R 2201/26; B60L 2240/527; B60L 2240/427
See application file for complete search history.

(56) References Cited

U.S. PATENT DOCUMENTS

| 1,466,011 A | 8/1923 | Youmans et al. |
| 4,301,899 A | 11/1981 | McSparran et al. |

(Continued)

FOREIGN PATENT DOCUMENTS

| CN | 101501973 A | 8/2009 |
| CN | 102189941 A | 9/2011 |

(Continued)

OTHER PUBLICATIONS

International Search Report for PCT/SE2015/051130 dated Jan. 22, 2016.
(Continued)

*Primary Examiner* — James M Dolak
(74) *Attorney, Agent, or Firm* — Moore & Van Allen PLLC; W. Kevin Ransom

(57) ABSTRACT

The present invention relates to a method for switching power supply path of at least one electrical machine, said electrical machine being arranged to be selectively supplied power by a first power supply path and a second power supply path, respectively, by alternately opening and closing said power supply paths, said first and second power supply paths being arranged to connect a power supply source to a first connection terminal means of said electrical machine. The method includes, when switching from said first power supply path to said second power supply path: opening said first power supply path; by means of said electrical machine, controlling a terminal voltage of said first connection ter- (Continued)

minal means to substantially a power supply voltage of said second power supply path; and closing said second power supply path.

17 Claims, 5 Drawing Sheets

(51) Int. Cl.
| | |
|---|---|
| *B60K 28/10* | (2006.01) |
| *B60K 6/48* | (2007.10) |
| *B60K 6/28* | (2007.10) |
| *B60L 15/20* | (2006.01) |
| *B60L 3/00* | (2019.01) |
| *B60L 50/53* | (2019.01) |
| *B60L 50/16* | (2019.01) |
| *B60K 6/22* | (2007.10) |
| *B60L 1/00* | (2006.01) |
| *B60L 5/18* | (2006.01) |
| *B60W 10/26* | (2006.01) |
| *B60L 5/00* | (2006.01) |

(52) U.S. Cl.
CPC .............. *B60K 28/10* (2013.01); *B60L 1/003* (2013.01); *B60L 3/00* (2013.01); *B60L 3/0069* (2013.01); *B60L 5/18* (2013.01); *B60L 15/2045* (2013.01); *B60L 50/16* (2019.02); *B60L 50/53* (2019.02); *B60W 10/26* (2013.01); *B60K 2006/4825* (2013.01); *B60L 5/00* (2013.01); *B60L 2200/18* (2013.01); *B60L 2200/26* (2013.01); *B60L 2200/36* (2013.01); *B60L 2210/10* (2013.01); *B60L 2210/14* (2013.01); *B60L 2210/40* (2013.01); *B60L 2240/12* (2013.01); *B60L 2240/421* (2013.01); *B60L 2240/423* (2013.01); *B60L 2240/427* (2013.01); *B60L 2260/26* (2013.01); *Y02T 10/62* (2013.01); *Y02T 10/64* (2013.01); *Y02T 10/70* (2013.01); *Y02T 10/7072* (2013.01); *Y02T 10/72* (2013.01)

(56) References Cited

U.S. PATENT DOCUMENTS

| | | | | |
|---|---|---|---|---|
| 7,714,544 | B2 * | 5/2010 | Bolz | H02J 7/0014 |
| | | | | 320/166 |
| 7,977,819 | B2 | 7/2011 | Kitanaka | |
| 8,615,341 | B2 * | 12/2013 | Kitanaka | B60L 9/00 |
| | | | | 701/22 |
| 9,008,798 | B2 * | 4/2015 | Tangren | A61N 1/3758 |
| | | | | 607/116 |
| 9,008,879 | B2 * | 4/2015 | Kumar | B60L 58/22 |
| | | | | 701/22 |
| 9,174,546 | B2 * | 11/2015 | Hatanaka | B60L 15/2009 |
| 9,350,283 | B2 * | 5/2016 | Kitanaka | H02P 21/22 |
| 9,748,832 | B2 * | 8/2017 | Nishikawa | H02H 3/33 |
| 9,834,206 | B1 * | 12/2017 | Yang | B60W 20/50 |
| 10,017,071 | B2 * | 7/2018 | Namou | B60L 11/1864 |
| 10,293,807 | B2 * | 5/2019 | Bae | B60W 10/26 |
| 10,523,133 | B2 * | 12/2019 | Yuyama | H02P 29/00 |
| 10,547,239 | B2 * | 1/2020 | Katsuki | H02M 3/155 |
| 10,828,998 | B2 * | 11/2020 | Weigel | B60L 5/40 |
| 2003/0052632 | A1 * | 3/2003 | Wissmach | H02P 3/065 |
| | | | | 318/362 |
| 2009/0322148 | A1 | 12/2009 | Kitanaka | |
| 2011/0166736 | A1 * | 7/2011 | Kitanaka | B60L 3/003 |
| | | | | 701/22 |
| 2011/0218698 | A1 | 9/2011 | Bissontz | |
| 2013/0069430 | A1 * | 3/2013 | Klemm | H02J 7/0068 |
| | | | | 307/31 |
| 2013/0245868 | A1 * | 9/2013 | Koga | B60L 7/10 |
| | | | | 701/22 |
| 2014/0012446 | A1 | 1/2014 | Kumar et al. | |
| 2014/0070605 | A1 * | 3/2014 | Hargett | B60L 3/0046 |
| | | | | 307/9.1 |
| 2014/0176028 | A1 * | 6/2014 | Tobari | B60L 15/20 |
| | | | | 318/400.02 |
| 2014/0210391 | A1 * | 7/2014 | Bozic | H02P 6/181 |
| | | | | 318/400.11 |
| 2015/0008674 | A1 * | 1/2015 | Hatanaka | B60L 11/16 |
| | | | | 290/45 |
| 2015/0202978 | A1 * | 7/2015 | Hatanaka | B60L 1/00 |
| | | | | 701/19 |
| 2015/0246615 | A1 * | 9/2015 | Rohlfing | B60L 11/005 |
| | | | | 318/139 |
| 2015/0364987 | A1 * | 12/2015 | Nishikawa | H02H 3/33 |
| | | | | 363/50 |
| 2016/0006377 | A1 * | 1/2016 | Hashimoto | B60L 3/12 |
| | | | | 290/31 |
| 2017/0001632 | A1 * | 1/2017 | Lindstrom | B60K 1/02 |
| 2017/0217313 | A1 * | 8/2017 | Hashimoto | B60L 3/003 |
| 2017/0274902 | A1 * | 9/2017 | Kumada | B60W 30/188 |
| 2017/0305298 | A1 * | 10/2017 | Takeshima | B60L 15/007 |

FOREIGN PATENT DOCUMENTS

| | | |
|---|---|---|
| EP | 718143 A1 | 8/2001 |
| EP | 2051358 A1 | 4/2009 |
| JP | 62216843 A | 9/1987 |
| JP | 2012090380 A | 5/2012 |
| JP | 2014131486 A | 7/2014 |
| KR | 1020140105025 A | 12/1899 |

OTHER PUBLICATIONS

Written Opinion of the International Searching Authority for PCT/SE2015/051130 dated Jan. 22, 2016.
Korean Office Action for Korean Patent Application No. 10-2017-7013371 dated Oct. 29, 2019.
Scania CV AB, Chinese Patent Application No. 201580057416.X, Office Action, dated Jan. 25, 2019.
Korean Office Action for Korean Patent Application No. 10-2017-7013372 dated Apr. 17, 2018.
European Search Report for European Patent Application No. 15854168 dated Jun. 4, 2018.
Supplementary European Search Report for European Patent Application No. 15854168 dated Jun. 12, 2018.
Scania CV AB, International Application No. PCT/SE2015/051130, International Preliminary Report on Patentability, dated May 2, 2017.
Scania CV AB, Chinese Application No. 201580057416.X, Second Office Action, dated Sep. 20, 2019.
Scania CV AB, European Application No. 15854168.0, Communication pursuant to Article 94(3) EPC, dated Nov. 22, 2019.

* cited by examiner

METHOD AND SYSTEM FOR SWITCHING FROM A FIRST POWER SUPPLY PATH TO A SECOND POWER SUPPLY PATH

CROSS-REFERENCE TO RELATED APPLICATION(S)

This application is a national stage application (filed under 35 § U.S.C. 371) of PCT/SE2015/051130, filed Oct. 26, 2015 of the same title, which, in turn claims priority to Swedish Application No. 1451299-0 filed Oct. 30, 2014 of the same title; the contents of each of which are hereby incorporated by reference.

FIELD OF THE INVENTION

The present invention relates to vehicles, and in particular to a method and system for switching power supply paths of an electrically powered vehicle. The present invention also relates to a vehicle, as well as a computer program product that implement the method according to the invention.

BACKGROUND OF THE INVENTION

With regard to vehicles in general, and at least to some extent heavy/commercial vehicles such as trucks, buses and the like, there is a constantly ongoing research and development with regard to increasing fuel efficiency and reducing exhaust emissions.

This is often at least partly due to growing governmental concern in pollution and air quality, e.g. in urban areas, which has also led to the adoption of various emission standards and rules in many jurisdictions.

Apart from governmental concern, one of the main expenses associated with vehicle operation is consumption of fuel for propulsion of the vehicle. The degree of utilization of heavy vehicles is often high, and with its associated fuel consumption, total emissions can be high and the cost of fuel can affect the profitability of the owner of the vehicle to a great extent.

In view of this, and in view of the fact that transport of goods on roads is expected to continuously increase resulting in an associated overall increase in emissions, alternatives to conventional combustion engine technology are being considered.

For example, electric vehicles and hybrid-electrical vehicles are undergoing extensive research and development. In connection with this, in an attempt to further reduce undesired emissions from vehicles, electrification of roads is currently being considered, so as to allow road vehicles to be electrified in a manner much similar to railway vehicles. The use of road powered vehicles has the potential of substantially reducing vehicle emissions while at the same time flexibility can be maintained, e.g. by allowing vehicles to connect to and disconnect from the road power network at will, and where e.g. a combustion engine can be used in hybrid-electrical vehicles when travelling on non-electrified roads.

For example, a system of overhead power lines can be used, where vehicles by means of current collectors such as pantographs can connect to the overhead power supply, thereby enabling the vehicle to be powered by the external power supply.

SUMMARY OF THE INVENTION

It is an object of the present invention to provide a method and system that allows for smooth switching between power supply paths for providing power to an electrical machine, where, according to one embodiment, the power supply paths can be arranged to power the electrical machine with different levels of safety.

According to the present invention, it is provided a method for switching power supply path of at least one electrical machine, said electrical machine being arranged to be selectively power supplied by a first power supply path and a second power supply path, respectively, by alternately opening and closing said power supply paths, said first and second power supply paths being arranged to connect a power supply source to a first connection terminal means of said electrical machine. The method includes, when switching from said first power supply path to said second power supply path:

opening said first power supply path;
  by means of said electrical machine, controlling a terminal voltage of said first connection terminal means to substantially a power supply voltage of said second power supply path, and;
  closing said second power supply path.

According to the above, electric road vehicles can be used to reduce combustion engine emissions. However, when supplying power to an electric road vehicle from an external power source there are safety issues that must be considered. For example, such vehicles comprise an electrical machine for providing propulsion power to drive wheels of the vehicle, where the vehicle can be an electric vehicle or a hybrid-electric vehicle where e.g. a combustion engine can be used to provide propulsion power when electric power is not available.

In vehicles of these kinds the electrical machine is usually connected to a combustion engine and/or components of the vehicle drive train, which components in general are in galvanic connection with the vehicle chassis, thereby rendering the electrical machine galvanically connected to the vehicle chassis as well. The electrical machine can also, similar to combustion engines, be suspended in relation to the vehicle chassis in a galvanically connected manner.

The vehicle chassis, however, although usually having the function of a ground connection in the vehicle electrical system, is not in itself grounded to earth, e.g. due to insulating rubber tyres. Road vehicles differ from railway vehicles in this manner, since railway vehicles are usually connected to earth by metal wheels contacting railway tracks properly connected to earth. In case the vehicle electric systems is a low voltage system ground faults have little or no impact if a conductive vehicle chassis is being touched e.g. by a person being present outside the vehicle.

With regard to road vehicles being powered by an external power supply source providing higher voltages, such as e.g. vehicles being powered by overhead power lines, power supply voltages can be in the order of hundreds of volts. Although being little risk to a person onboard the vehicle, a ground fault at such voltages can result in fatal consequences if a person connected to earth, e.g. by being present outside the vehicle, accidentally contacts a high voltage vehicle chassis. For this reason, safety systems, e.g. ground fault detection systems, must be used to ensure that such situations do not occur.

Such safety systems can also involve galvanic isolation of the drive train with respect to the vehicle external power supply system. However, with regard to, in particular, vehicles being powered by an external power system, such safety systems must be capable of operating also at high powers, thereby rendering the protection systems bulky and expensive. According to one embodiment, the present invention relates to a system where drawbacks of the use of such safety systems are alleviated, where different power supply paths providing different safety measures are used in different situations.

For example, when the vehicle is stationary or moving at low speeds, the electrical machine can be arranged to be powered via a protection system that provides galvanic isolation in relation to the external power supply system. On the other hand, when the vehicle is moving at higher speeds and it is unlikely that outside persons or objects accidentally contacts the vehicle chassis while simultaneously being in contact with earth, safety precautions can be alleviated and power be drawn directly from the external power source without providing intermediate galvanic isolation. Consequently, according to this kind of system, the electrical machine can be powered using two different power supply paths. However, the use of two different power supply paths inherently means that switching between the power supply paths is required, which oftentimes must be performed in situations when power consumption is high, and in a manner that does not impose undesired jolts/jerks in the drive train or otherwise imposes uncomfortable effects or excessive stress of vehicle components.

According to the present invention, undesired effects when switching from a first power supply path to a second power supply path can be reduced by a system and method where the currently active power supply path is opened, i.e. the conducting circuit is broken such that there no longer is a complete, or current conducting, path between the active power supply and the electrical machine, e.g. by suitable switching means opening, i.e. breaking/disconnecting, the conducting circuit, and where the terminal voltage of the electrical machine is controlled by means of the electrical machine to the voltage of the second power supply path. When the terminal voltage substantially equals the voltage of the second power supply path the second power supply path is closed, i.e. a complete, or current conducting, path between the second power supply and the electrical machine is established, e.g. by suitable switching means closing, i.e. connecting, the conducting circuit, and the electrical machine being powered by the second power supply path. Power supply paths of the disclosed kind often have different power supply voltages, and synchronization of the voltage according to the present invention substantially reduces the risk for undesired jolts/jerks.

According to a preferred embodiment, the terminal voltage of the electrical machine is the terminal voltage of an inverter drive being used to control one or more of supply voltage, torque and speed of the electrical machine. As is realized by the person skilled in the art, rotation of the electrical machine will inherently impact the terminal voltage of the inverter drive.

When switching to an external power source having a voltage that differs from the voltage of the vehicle, electric arcs and/or sparks often occur between current collector, such as e.g. a pantograph, and the power lines of the external power source. Such electric arcs and/or sparks will erode the surface of the current collector and reduce component life cycle. The present invention reduces the risk of the occurrence of such arcs and/or sparks and hence also reduces wear of components.

Further characteristics of the present invention and advantages thereof are indicated in the detailed description of exemplary embodiments set out below and the attached drawings.

DETAILED DESCRIPTION OF THE INVENTION

The present invention will be exemplified in the following for a parallel hybrid vehicle. The invention, however, is applicable for any hybrid electrical vehicle where a switching of power sources is performed. For example, the invention is applicable for parallel hybrid vehicles and series hybrid vehicles. Further, for example, the invention is applicable for power supply path switching in hybrid vehicles having a plurality of electrical machines, where these, e.g. can be interconnected, directly and/or by means of transmission elements, such as e.g. planetary gears. The invention is applicable for any electric hybrid vehicle having one or more planetary gears, and also for power-split hybrid vehicles and series-parallel hybrid vehicles. The invention is also applicable for electric vehicles.

Figure 1A:
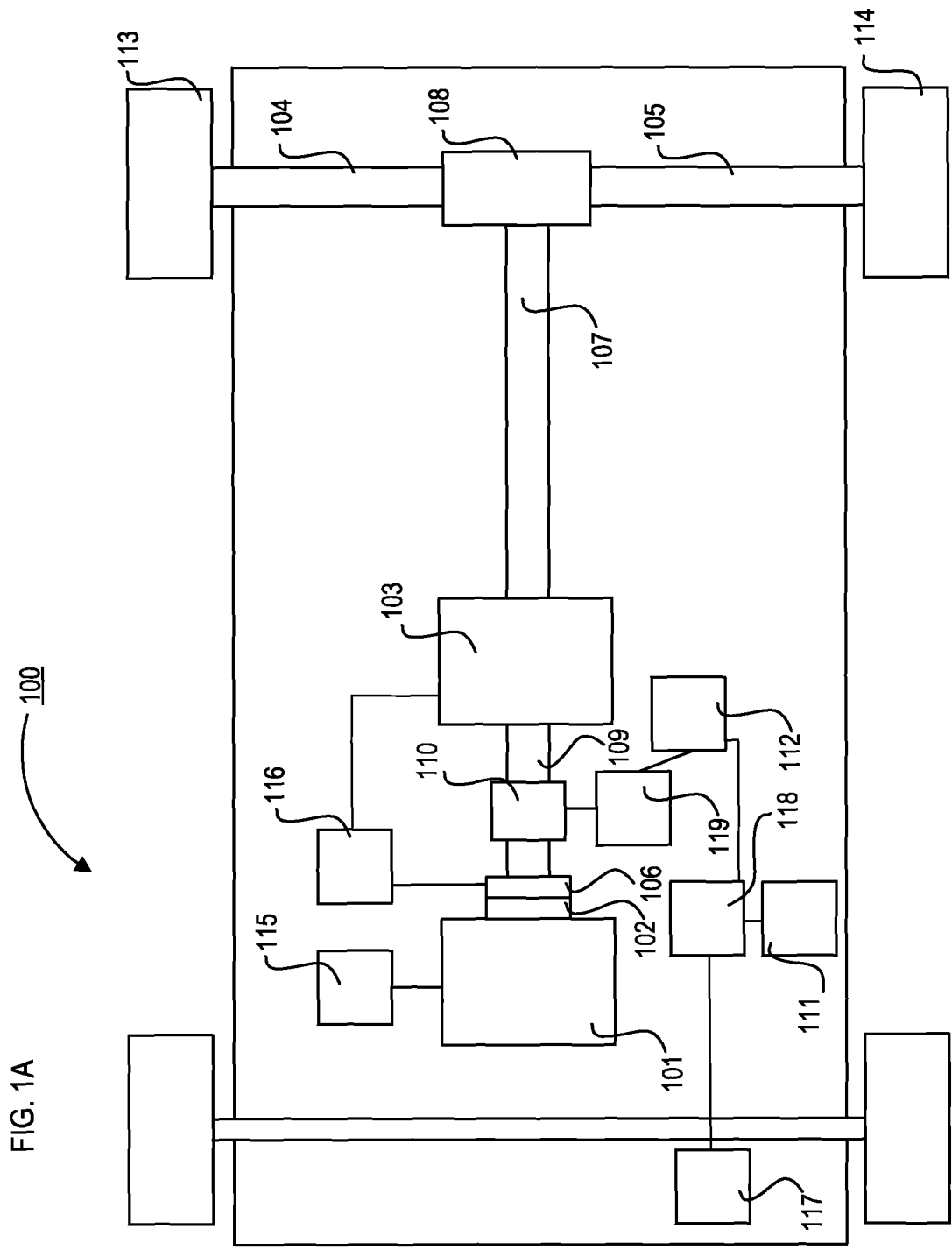
FIG. 1A illustrates a power train of an exemplary road-powered electric vehicle.

FIG. 1A schematically depicts a power train of an exemplary road-powered electric vehicle 100. The vehicle 100 in FIG. 1A is a parallel hybrid vehicle 100. The power train of the parallel hybrid vehicle in FIG. 1A comprises a combustion engine 101 which, in a conventional manner, is connected, via an output shaft of the engine 101, to a gearbox 103 via a clutch 106. The engine 101 is controlled by the vehicle's control system via a control unit 115. The clutch 106, which, for example, can be an automatically operated clutch, and the gearbox 103 are also controlled by the vehicle's control system by means of a control unit 116.

The vehicle further includes a hybrid portion with an electrical machine 110, which is connected to the input shaft 109 of the gearbox 103, downstream of the clutch 106, so that the gearbox input shaft 109 can be driven by the electrical machine 110 also when the clutch 106 is open. The parallel hybrid vehicle can thus provide force to drive wheels 113, 114 from two separate power sources simultaneously, i.e. both from the combustion engine 101 and from the electrical machine 110. Alternatively, the vehicle may be propelled by one power source at a time, i.e. either by the combustion engine 101 or the electrical machine 110.

The hybrid portion also comprises further components. FIG. 1A depicts part of such components and shows the electrical machine 110, an inverter drive 119 for controlling the electrical machine 110, an energy storage such as one or more batteries 111 and a hybrid control unit 112 which controls functions of the hybrid portion. In addition, FIG. 1A schematically discloses a current collector 117, such as e.g. a pantograph for connecting e.g. to overhead power lines. The vehicle 100 also includes a switching system 118 for switching power supply paths as will be described below.

As indicated above, the functions of a vehicle are, in general, controlled by a number of control units, and control systems in modern vehicles generally comprise a communication bus system consisting of one or more communication buses for connecting a number of electronic control units (ECUs), or controllers, to various components on board the vehicle. Such a control system may comprise a large number of control units, and the control of a specific function may be divided between two or more of them.

For the sake of simplicity, FIG. 1A depicts only control units 112, 115-116 but vehicles 100 of the illustrated kind are often provided with significantly more control units, as one skilled in the art will appreciate. Control units 112, 115-116 can communicate with one another via said communication bus system.

The present invention can be implemented in any suitable control unit, and in the illustrated example the invention is implemented in control unit 112 for controlling the hybrid drive portion of the vehicle. The invention may, however, also be implemented in any other suitable control unit. The control of the switching of power supply paths according to the present invention will usually depend on signals being received from other control units and/or vehicle components, and it is generally the case that control units of the disclosed type are normally adapted to receiving sensor signals from various parts of the vehicle 100. Control units of the type depicted are also usually adapted to delivering control signals to various parts and components of the vehicle. The control unit 112 will, for example, apart from other control of the hybrid drive system provide control signals for controlling opening and closing of power supply paths.

Said control is often controlled by programmed instructions. The programmed instructions typically consist of a computer program which, when it is executed in a computer or control unit, causes the computer/control unit to exercise the desired control, such as method steps according to the present invention. The computer program usually constitutes a part of a computer program product, wherein said computer program product comprises a suitable storage medium 121 (see FIG. 1B) with the computer program 126 stored on said storage medium 121. The computer program can be stored in a non-volatile manner on said storage medium. Said digital storage medium 121 can, for example, consist of any of the group comprising: ROM (Read-Only Memory), PROM (Programmable Read-Only Memory), EPROM (Erasable PROM), Flash memory, EEPROM (Electrically Erasable PROM), a hard disk unit etc, and be arranged in or in connection with the control unit, whereupon the computer program is executed by the control unit. The behavior of the vehicle in a specific situation can thus be adapted by modifying the instructions of the computer program.

Figure 1B:
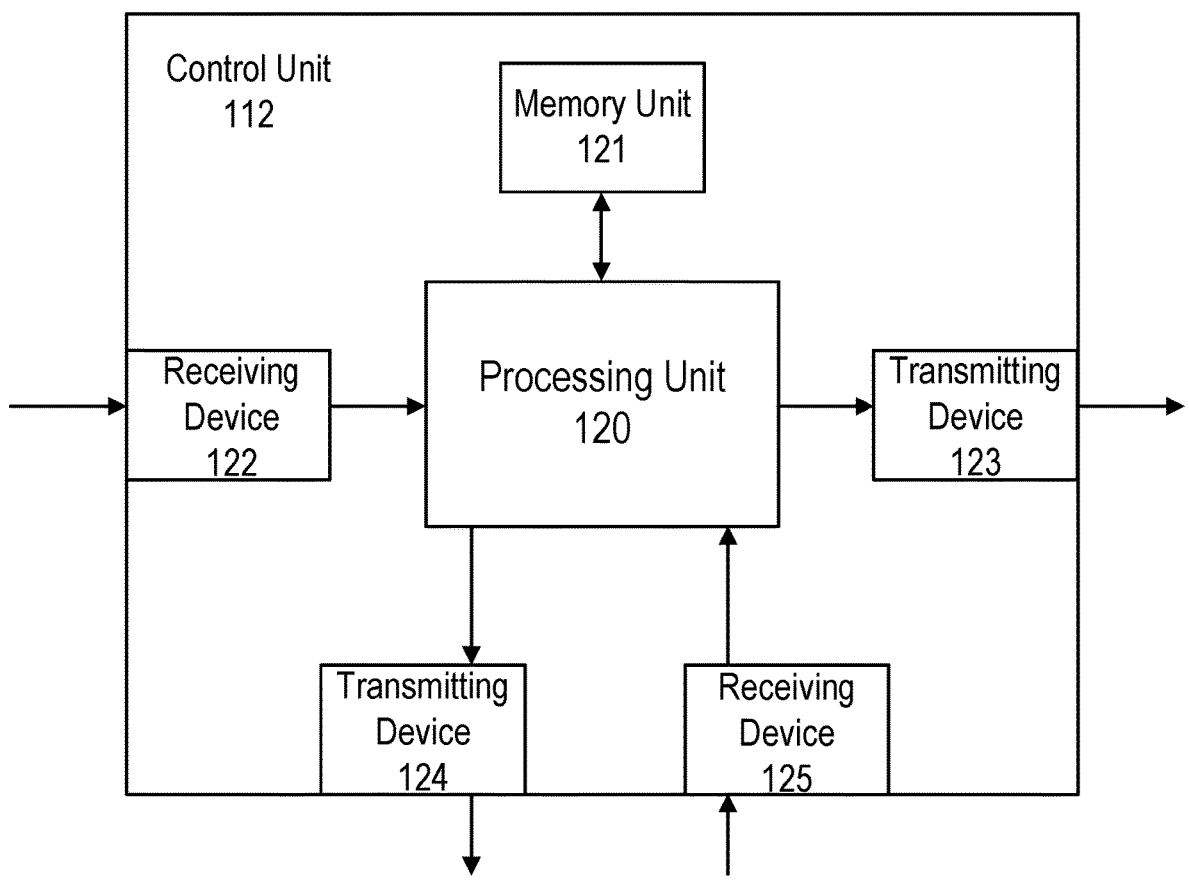
FIG. 1B illustrates an example of a control unit in a vehicle control system.

An exemplary control unit (the control unit 112) is shown schematically in FIG. 1B, wherein the control unit can comprise a processing unit 120, which can consist of, for example, any suitable type of processor or microcomputer, such as a circuit for digital signal processing (Digital Signal Processor, DSP) or a circuit with a predetermined specific function (Application Specific Integrated Circuit, ASIC). The processing unit 120 is connected to a memory unit 121, which furnishes the processing unit 120, with e.g. the stored program code 126 and/or the stored data that the processing unit 120 requires to be able to perform calculations. The calculating unit 120 is also arranged so as to store partial or final results of calculations in the memory unit 121.

Furthermore, the control unit 112 is equipped with devices 122, 123, 124, 125 for receiving and transmitting input and output signals, respectively. These input and output signals can comprise waveforms, pulses or other attributes that the devices 122, 125 for receiving input signals can detect as information for processing by the calculating unit 120. The devices 123, 124 for transmitting output signals are arranged so as to convert calculation results from the calculating unit 120 into output signals for transfer to other parts of the vehicle control system and/or the component (s) for which the signals are intended. Each and every one of the connections to the devices for receiving and transmitting respective input and output signals can consist of one or more of a cable; a data bus, such as a CAN bus (Controller Area Network bus), a MOST bus (Media Oriented Systems Transport) or any other bus configuration, or of a wireless connection.

As was mentioned above, with regard to road powered electric vehicles there are additional safety aspects that need to be considered. This is accomplished, according to the present invention, by the use of different power supply paths, where the different power supply paths are used in different situations and exhibiting differing safety measures.

Figure 2:
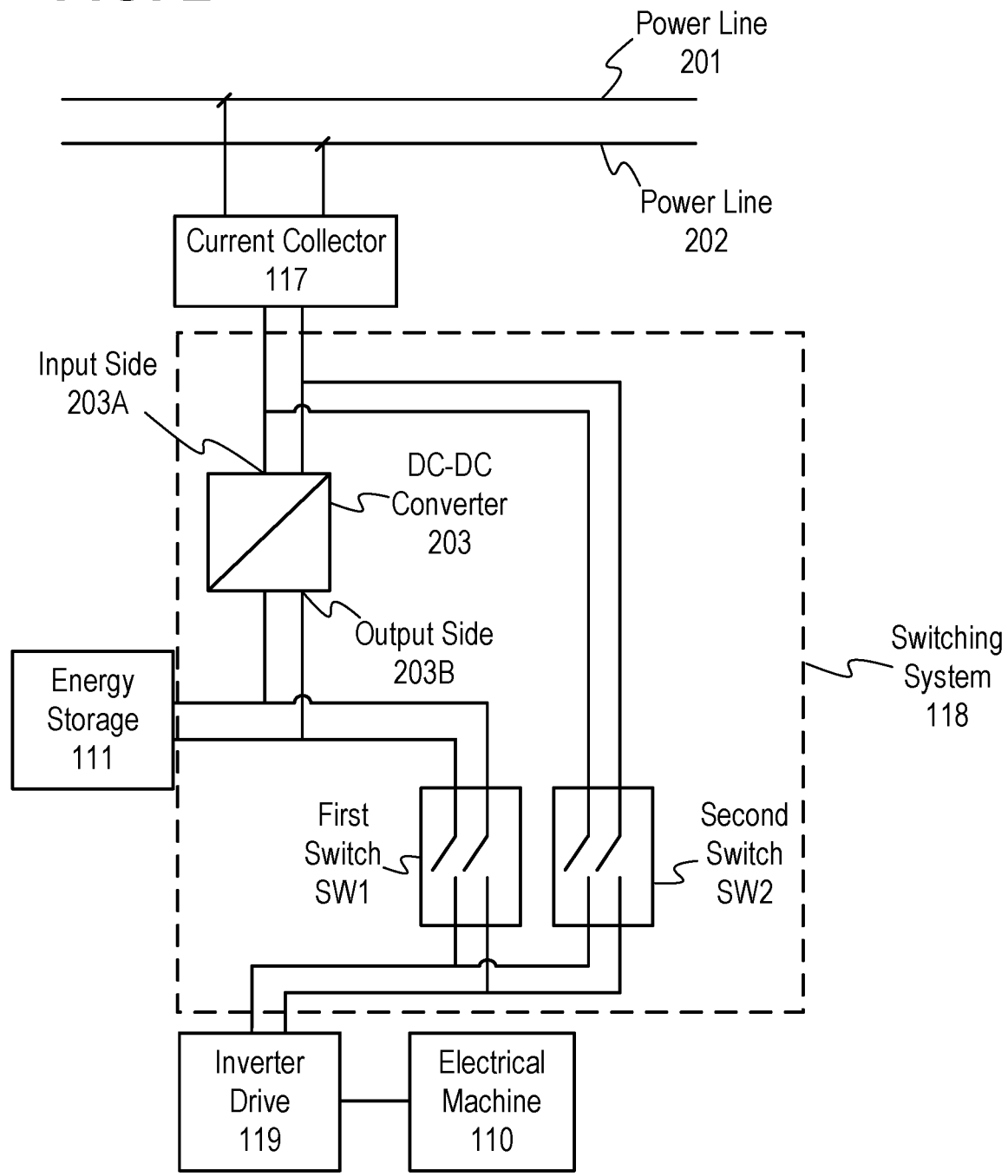
FIG. 2 illustrates an exemplary system of separate power supply paths.

FIG. 2 discloses the embodiment shown in FIG. 1A, in particular with regard to the power supply paths more in detail. In FIG. 2, the current collector, in this example a pantograph, 117 is connected to overhead power lines 201, 202 providing power from an external power source. In the current example, the power supply is a direct current power supply of relatively high voltage, e.g. in the order of 300-1000 V. The system disclosed in FIG. 2 further includes a DC-DC converter, which provides a galvanic isolation between the DC-DC converter's 203 input side 203A and output side 203B, and hence between the external power supply and the electrical machine. The DC-DC converter output 203B is further in connection with the energy storage 111, consequently allowing charging of the energy storage 111. The DC-DC converter output 203B is further arranged to be selectively connectable to the electrical machine 110 inverter drive 119 by being connected/disconnected from the inverter drive 119 by means of a first switch SW1. Consequently, the electrical machine 110, via inverter drive 119, can be powered by a first power supply path through switch SW1, where power can be supplied from either energy storage 111 and/or the external power supply through DC-DC converter 203. The DC-DC converter 203 can further be arranged to provide a power supply on the output 203B being different, e.g. of lower voltage, than the external power supply. The electrical machine 110 can be power supplied by energy storage 111 e.g. when connection between a pantograph 117 and power lines 201, 202 is broken and/or when the vehicle leaves an electric road in order to, instead, be driven along a road where no external power supply is available.

The system disclosed in FIG. 2 further includes a second power supply path for providing power to the electrical machine 110. The second power supply path provides power directly from pantograph 117 to inverter drive 119 via a second switch SW2, the second power supply path consequently also being arranged to be selectively connectable to the electric machine 110.

As was mentioned above, road vehicles face different problems when compared to railway vehicles since road vehicles, e.g. due to rubber tyres are not solidly connected to earth as is the case in railway vehicles where the tracks provides a solid connection to earth. This, in turn means that providing power to the vehicle via the second power supply path, i.e. via switch SW2, provides a power supply of the electrical machine 110 that is not galvanically isolated from overhead power lines 201, 202. Because of this, if a ground fault rendering the vehicle chassis potential different from earth potential occurs, a person standing outside the vehicle being in connection with earth and touching the vehicle chassis can be subjected to hazardous and potentially lethal voltages through the vehicle chassis.

For this reason, use of power supply paths according to the second power supply path of FIG. 2 are not suitable for use when the vehicle, e.g., is stationary since a person standing in connection with both chassis and earth could be subjected to danger if a ground fault occurs. For this reason, power supply path of the kind first disclosed with reference to FIG. 2, i.e. via DC-DC converter 203, can be used in such situations to ensure that hazardous situations do not occur.

DC-DC converters 203 of the disclosed kind, however, has the disadvantage that if this power supply path is exclusively used for providing power to the electrical machine, the DC-DC converter 203 must be capable of handling relatively high powers, in particular in the case of propulsion of heavy vehicles. For this reason, according to one embodiment of the present invention, a system of the kind disclosed in FIG. 2 is used, where the first power supply path i.e. via DC-DC converter 203, can be used when the vehicle is stationary and/or when the vehicle is moving at vehicle speeds below a first speed limit $v_{lim1}$.

For example, the first speed limit $v_{lim1}$ can be set to a speed at which it is highly unlikely that a person would simultaneously be in contact with earth and the vehicle chassis, at least without the risk of being in great danger for other reasons e.g. due to the vehicle speed. When the vehicle speed exceeds said first speed limit $v_{lim1}$ the power supply can be switched to the second power supply path, i.e. via switch SW2 in FIG. 2 so that the electrical machine, via inverter driver 119, is powered directly by the external power supply. Use of this system, consequently, means that DC-DC converter 203 can be dimensioned such that the maximum power that the DC-DC converter must be capable of converting can be set to a considerably lower power than the maximum power that vehicle in use consumes from the external power source.

Figure 3:
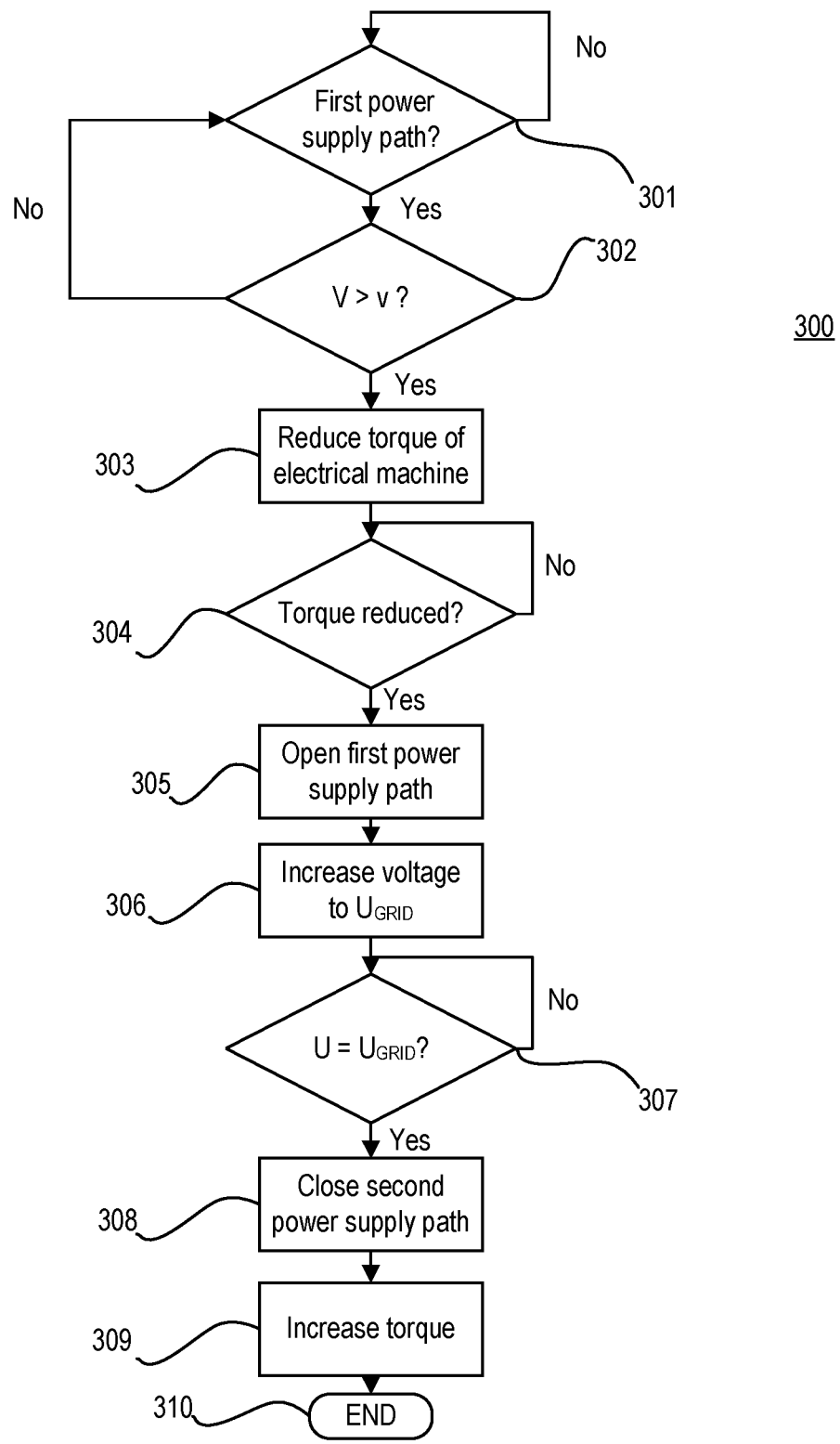
FIG. 3 illustrates an exemplary embodiment of a method according to the present invention.

According to the above, the present invention provides a method for switching between different power paths for powering an electrical machine, and a first exemplary embodiment 300 of the present invention is shown in FIG. 3, which exemplifies switching from the first power supply path (via DC-DC converter 203) to the second power supply path.

In step 301 it is determined if the vehicle is powered according to the first power supply path, i.e. via DC-DC converter 203. The method remains in step 301 as long as this is not the case. When it is determined in step 301 that the vehicle is power supplied via the first power supply path, the method continues to step 302 where it is determined whether the vehicle speed $v_{vehicle}$ is higher than said first vehicle speed $v_{lim1}$. When this is not the case, i.e. when the vehicle speed is below said first speed limit $v_{lim1}$, the method returns to step 301. When the vehicle speed $v_{vehicle}$ exceeds said first speed limit $v_{lim1}$ the method continuous to step 303.

In step 303 the torque produced by the electrical machine 110 is reduced to a torque T1, the torque T1 being zero, or substantially zero, so as to thereby reduce the power being consumed via the first power supply path to substantially zero. The method then continues to step 304, where it is determined whether the torque produced by the electrical machine 110 has been reduced to a sufficient extent. For example, the torque can be arranged to be reduced to zero or to some other comparatively low torque for which it is determined that the vehicle drive train does not suffer any undesired jolts or damages when power supply is broken. According to one embodiment, the torque is reduced at least to a torque T1 that is at most 10% of the torque level from which torque is being reduced in step 303. The method remains in step 304 until the torque has been reduced to the desired extent after which switch SW1 of FIG. 2 is opened, step 305, thereby disconnecting the first power supply path.

Figure 4A:
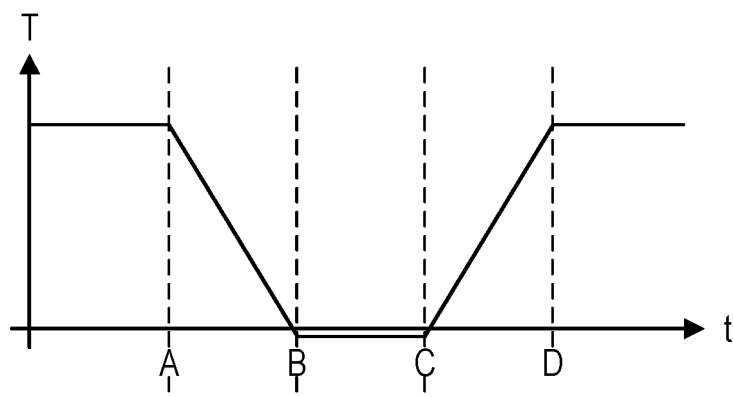
FIGS. 4A-D illustrates the embodiment of FIG. 3.
Figure 4B:
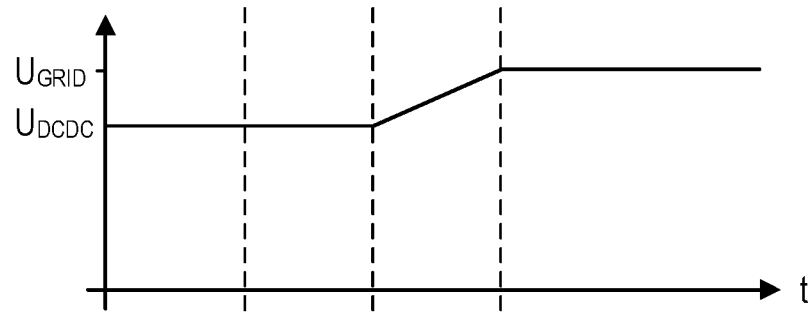
Figure 4C:
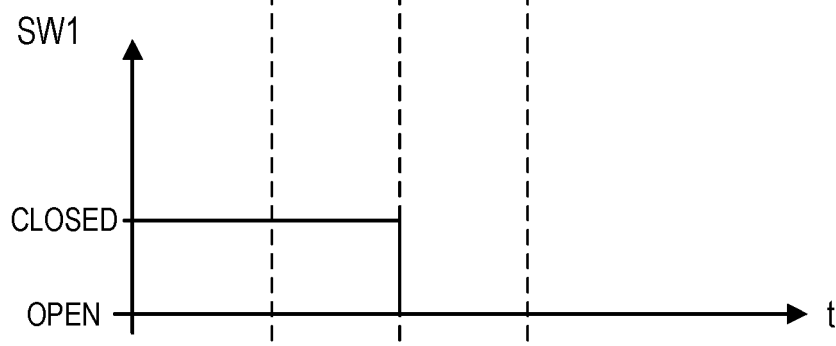
Figure 4D:
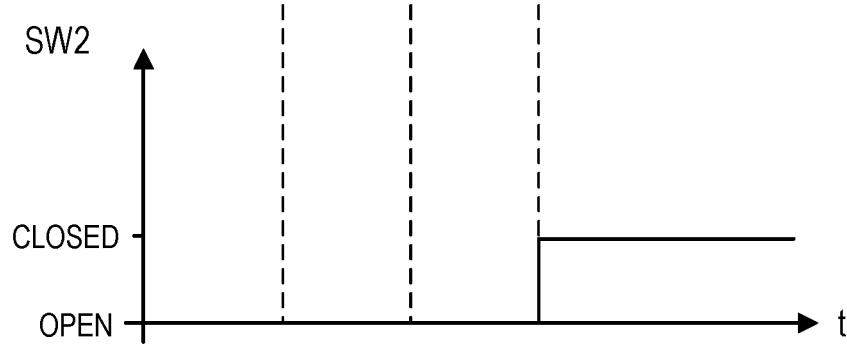

This is also exemplified in FIG. 4A-D, where FIG. 4A discloses the torque produced by the electrical machine, and where reduction of the torque produced by the electrical machine is commenced at time A when it is determined that a switch of power supply paths is to be performed. When the torque has been reduced to sufficient extent, time B in FIG. 4A, switch SW1 is opened according to step 305. This is illustrated in FIG. 4C. FIG. 4B discloses the current terminal voltage of the electrical machine inverter drive 119. As was mentioned above, the two power paths need not necessarily provide power to the electrical machine 110 at similar voltages, but the first and second power supply paths can be arranged to provide power of different voltages where the second power supply path can be arranged to provide power at a higher or lower voltage than the first power supply path.

This is also the case in the present example, where the second power supply path is arranged to provide power at a higher voltage, $U_{GRID}$, than the voltage $U_{DCDC}$ of the first power supply path. As can also be seen from FIG. 4D, switch SW2 is open while the electrical machine 110 is powered by the first power supply path via switch SW1. When the first power supply path has been disconnected by opening switch SW1, step 305, the method continues to step 306 where the voltage of the connection terminals of inverter drive 119 is controlled to the voltage $U_{GRID}$ of the second power supply path, i.e. the prevailing voltage upstream switch SW2. The voltage is controlled by means of electrical machine 110, and oftentimes also the inverter drive 119, which can control the inverter drive terminal voltage by means of suitable switching of the voltage being induced by the electrical machine, and/or controlling power being consumed by the electrical machine, also by means of suitable switching, thereby e.g. reducing the voltage of the inverter drive connection terminals.

The terminal voltage is controlled using the electrical machine by applying a positive or negative torque to the vehicle drive train. In general, the energy needed to control the terminal voltages of inverter drive 119 to the desired voltages is relatively small and can hence be easily accomplished. If the voltage is to be increased, as in the present example, the electrical machine 110 will be controlled to apply a regenerative braking and, conversely, if the voltage is to be decreased the electrical machine can be controlled to apply a positive torque consuming energy from e.g. capacitors of the inverter drive, hence reducing the voltage. As mentioned, the required energy is often small, and this is indicated by a slight negative torque between time B and C in FIG. 4A.

When it is determined that the voltage of the connection terminals of inverter drive 119 has been increased to the desired voltage, step 307, the switch SW2 is closed, step 308, in order to provide a direct connection between the external power source and inverter drive 119. This is shown at point C in FIG. 4D. In step 309 the torque produced by the electrical machine 110 is increased to requested torque, e.g. the torque being produced prior to switching power supply paths. This is shown between time C and D in FIG. 4A, and hence the vehicle can then be driven using power from the second power supply path. The method is ended in step 310.

The present invention provides a method for switching power supply paths that imposes little or no transient behaviors in the vehicle drive train, thereby substantially reducing risks for jolts and other stresses on vehicle components etc. From a driver point of view, the switching between power supply paths according to FIGS. 4A-C will be experienced as smooth and much resembling a conventional gear change in the gearbox 103, such as e.g. a gear change of an automated manual transmission (AMT) gearbox. In fact, according to one embodiment of the present invention, the same or similar software routines that are used to control change of gears in the gearbox 103 can be used when switching power supply paths according to the present invention. The ramp function when reducing/increasing the torque delivered by the electrical machine can be arranged to take on any suitable appearance, as is appreciated to the person skilled in the art. For example, the ramp function can be linear as in FIG. 4A, but the ramp function can also constitute e.g. an exponential function, or a combination of different ramp functions, where different ramp functions e.g. are being used for different torque levels. The ramp function can be designed to release torsions in the drive train in a controlled manner so as to obtain a smooth and comfortable switching of power supply paths.

Further, the method exemplified in FIG. 3, 4A-D, relates to switching of power supply paths when the need for power of the vehicle is increasing and the switching of power supply path is performed from a first power supply path having higher safety measures in relation to the power supply path to which the power supply is switched. However, the method is equally applicable when the situation is the opposite, and can be used also e.g. when the vehicle is decelerating with reducing speed as result and a switch to a power supply path having relatively higher safety measures is to be performed. With regard to the above example, the terminal voltage would, instead of being increased, be reduced from voltage $U_{GRID}$ to voltage $U_{DCDC}$ by means of the electrical machine.

Further, it is also possible that the second power supply path, i.e. the external power supply path according to the present example, has a lower voltage $U_{GRID}$ than the voltage $U_{DCDC}$ of the first power supply path. When this is the case, the voltage will be reduced instead of increased when switching power supply paths due to an increasing demand for power of the vehicle. Conversely, in this case, when switching power supply paths due e.g. to a decreased demand for power, the voltage will, instead, be increased.

Furthermore, the invention is applicable in any situation where an electrical machine can be selectively powered by different power supply paths, and in particular when the supply voltage of the power supply paths is different, i.e. irrespective of whether the vehicle is a vehicle being arranged to be power supplied by an external power source. Hence, the power supply paths need not be arranged to provide different measures of safety.

The invention claimed is:

1. A method for switching a power supply path of at least one electrical machine in a vehicle, said electrical machine in operative, selective connection with a first power supply path and a second power supply path, respectively, by alternately opening and closing said first and second power supply paths, said first and second power supply paths being arranged to connect a power supply source to a first connection terminal associated with said electrical machine, wherein said first power supply path has a first power supply voltage and said second power supply path has a second power supply voltage, said second power supply voltage being different from said first power supply voltage, and wherein only one of said first and second power supply paths comprises galvanic isolation in relation to the external power supply system, wherein said method comprises, when switching from said first power supply path to said second power supply path:
opening said first power supply path;
altering a torque produced by said electrical machine, to thereby via a corresponding inverter drive, control a terminal voltage of said first connection terminal associated with said electrical machine to substantially equal a power supply voltage of said second power supply path; and
closing said second power supply path.

2. The method according to claim 1, wherein said first connection terminal is a connection terminal of the inverter drive used to control said electrical machine.

3. The method according to claim 2, wherein said inverter drive controls at least one of: a voltage of said electrical machine, a torque being delivered by said electrical machine, or a rotational speed of said electrical machine.

4. The method according to claim 2, further comprising:
controlling said terminal voltage of said first connection terminal by using said inverter drive to control said electrical machine.

5. The method according to claim 1, further comprising, prior to opening said first power supply path:
reducing a torque being delivered by said electrical machine to a first torque.

6. The method according to claim 5, wherein said first torque being between or including zero torque and 10% of a torque being delivered by said electrical machine, when said reduction of torque is commenced.

7. The method according to claim 1, further comprising, when said second power supply path has been closed:
increasing a torque delivered by said electrical machine to a torque being requested from said electrical machine.

8. The method according to claim 5, further comprising:
reducing or increasing said torque being delivered by said electrical machine according to a ramp function.

9. The method according to claim 1, wherein one of said first and second power supply paths is used at vehicle speeds below a first vehicle speed, and where the other of said first and second power supply paths is used at vehicle speeds at or above said first vehicle speed.

10. The method according to claim 1, wherein said vehicle, when in motion, being connected to a vehicle external power source, at least one of said first and second power supply paths providing power from said vehicle external power supply source.

11. The method according to claim 1, further comprising:
controlling said terminal voltage of said first connection terminal associated with said electrical machine to substantially equal a power supply voltage of said second power supply path when said electrical machine is disconnected from said first power supply path and said second power supply path.

12. A computer program product comprising program code stored in a non-transitory computer-readable medium readable by a computer, said computer program product used for switching a power supply path of at least one electrical machine in a vehicle, said electrical machine in operative, selective connection with a first power supply path and a second power supply path, respectively, by alternately opening and closing said first and second power supply paths, said first and second power supply paths being arranged to connect a power supply source to a first connection terminal associated with said electrical machine, wherein said first power supply path has a first power supply voltage and said second power supply path has a second power supply voltage, said second power supply voltage being different from said first power supply voltage, and wherein only one of said first and second power supply paths comprises galvanic isolation in relation to the external power supply system, said computer program code comprising computer instructions to cause one or more computer processors to perform the operations of when switching from said first power supply path to said second power supply path:

opening said first power supply path;

altering a torque produced by said electrical machine, to thereby via a corresponding inverter, control a terminal voltage of said first connection terminal means associated with said electrical machine to substantially equal a power supply voltage of said second power supply path; and closing said second power supply path.

13. A system for switching power a supply path of at least one electrical machine in a vehicle, said electrical machine in operative, selective connection with a first power supply path and a second power supply path, respectively, by alternately opening and closing said first and second power supply paths, said first and second power supply paths being arranged to connect a power supply source to a first connection terminal means associated with said electrical machine, wherein said first power supply path has a first power supply voltage and said second power supply path has a second power supply voltage, said second power supply voltage being different from said first power supply voltage, and wherein only one of said first and second power supply paths comprises galvanic isolation in relation to the external power supply system, wherein said system includes, when switching from said first power supply path to said second power supply path:

means for opening said first power supply path;

means for altering a torque produced by said electrical machine, to thereby via a corresponding inverter drive, control a terminal voltage of said first connection terminal associated with said electrical machine to substantially equal a power supply voltage of said second power supply path; and means for closing said second power supply path.

14. A vehicle comprising a system for switching a power supply path of at least one electrical machine in a vehicle, said electrical machine in operative, selective connection with a first power supply path and a second power supply path, respectively, by alternately opening and closing said first and second power supply paths, said first and second power supply paths being arranged to connect a power supply source to a first connection terminal means associated with said electrical machine, wherein said first power supply path has a first power supply voltage and said second power supply path has a second power supply voltage, said second power supply voltage being different from said first power supply voltage, and wherein only one of said first and second power supply paths comprises galvanic isolation in relation to the external power supply system, wherein said system includes, when switching from said first power supply path to said second power supply path:

means for opening said first power supply path;

means for altering a torque produced by said electrical machine, to thereby via a corresponding inverter drive, control a terminal voltage of said first connection terminal associated with said electrical machine to substantially equal a power supply voltage of said second power supply path; and means for closing said second power supply path.

15. A method according to claim 1, wherein said first power supply path is at a lower voltage than said second power supply path, wherein said first power supply path uses galvanic isolation in relation to the external power supply system, said method comprising:

when a speed of the vehicle is below a first vehicle speed, switching or maintaining a connection between said first power supply path and the first connection terminal associated with said electrical machine, thereby providing galvanic isolation; and when a speed of the vehicle is above a first vehicle speed, switching or maintaining a connection between said second power supply path and the first connection terminal associated with said electrical machine, where galvanic isolation is not required.

16. A computer program product according to claim 12, wherein said first power supply path is at a lower voltage than said second power supply path, wherein said first power supply path uses galvanic isolation in relation to the external power supply system, said computer program code comprising computer instructions to cause one or more computer processors to perform the operations of:

when a speed of the vehicle is below a first vehicle speed, switching or maintaining a connection between said first power supply path and the first connection terminal associated with said electrical machine, thereby providing galvanic isolation; and when a speed of the vehicle is above a first vehicle speed, switching or maintaining a connection between said second power supply path and the first connection terminal associated with said electrical machine, where galvanic isolation is not required.

17. A system according to claim 13, wherein said first power supply path is at a lower voltage than said second power supply path, wherein said first power supply path uses galvanic isolation in relation to the external power supply system, said system comprising:

when a speed of the vehicle is below a first vehicle speed, means for switching or maintaining a connection between said first power supply path and the first connection terminal associated with said electrical machine, thereby providing galvanic isolation; and when a speed of the vehicle is above a first vehicle speed, means for switching or maintaining a connection between said second power supply path and the first connection terminal associated with said electrical machine, where galvanic isolation is not required.

* * * * *

UNITED STATES PATENT AND TRADEMARK OFFICE
CERTIFICATE OF CORRECTION

| | | |
|---|---|---|
| PATENT NO. | : 11,097,713 B2 | Page 1 of 1 |
| APPLICATION NO. | : 15/513033 | |
| DATED | : August 24, 2021 | |
| INVENTOR(S) | : Mathias Björkman et al. | |

It is certified that error appears in the above-identified patent and that said Letters Patent is hereby corrected as shown below:

In the Claims

In Column 11, Claim 12, Line 9, please remove "means"

Signed and Sealed this
Fifteenth Day of November, 2022

Katherine Kelly Vidal
*Director of the United States Patent and Trademark Office*